March 10, 1942. J. F. CHING 2,276,019
AUTO DOOR LOCK
Filed Nov. 17, 1939
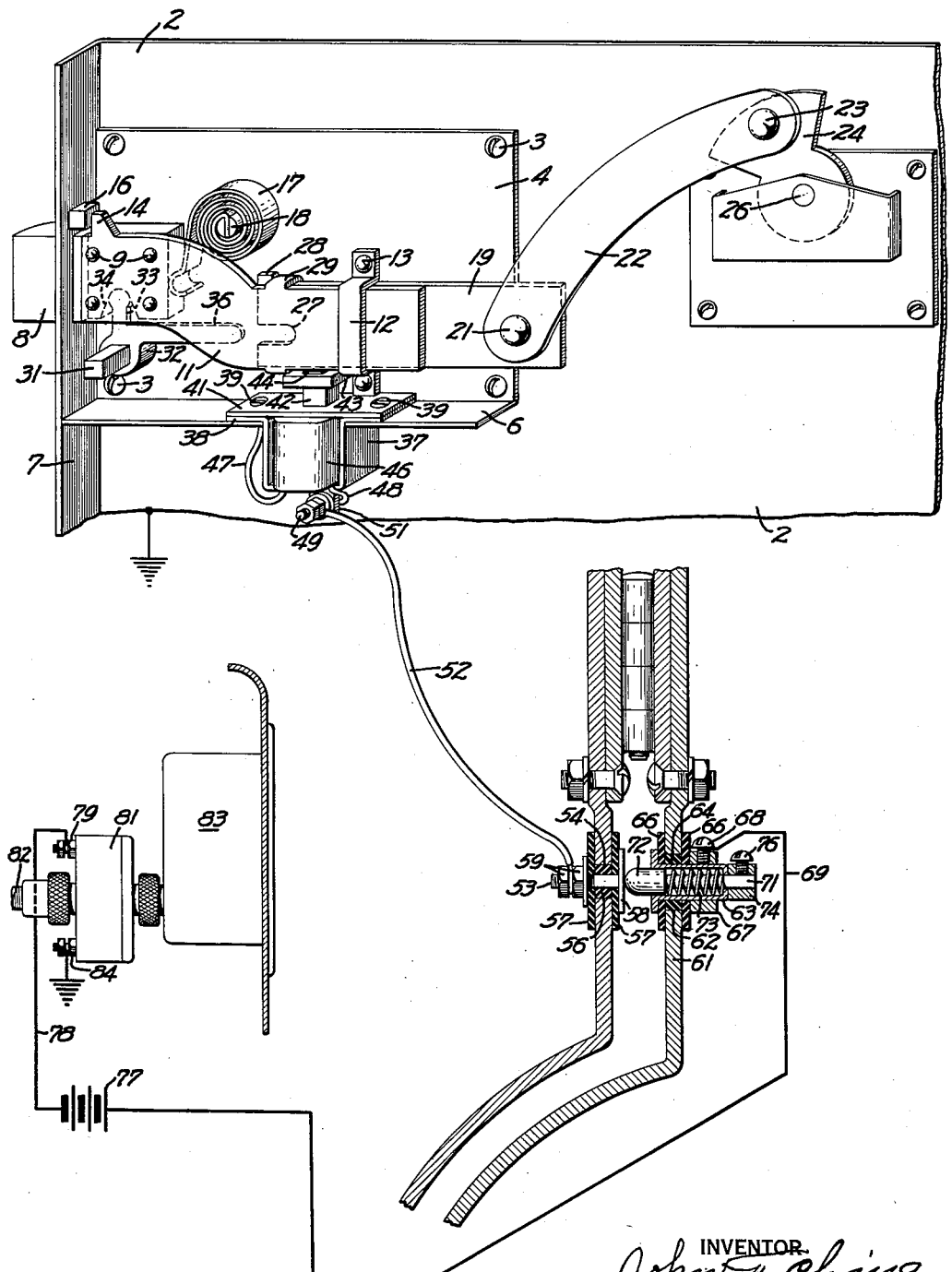
INVENTOR
John F. Ching
BY
Harry C. Schwab
ATTORNEY Patented Mar. 10, 1942

2,276,019

UNITED STATES PATENT OFFICE 2,276,019

AUTO DOOR LOCK

John F. Ching, Berkeley, Calif.

Application November 17, 1939, Serial No. 304,959

1 Claim. (Cl. 292—150)

This invention relates to motor vehicles and particularly to locks for the doors thereof.

It is an object of the invention to provide a door lock which becomes operative to lock a door of the vehicle if and when the vehicle is in motion.

Another object of the invention is to provide a safety lock, which precludes opening of vehicle doors while the vehicle is in motion, which may be added as an attachment to existing door lock mechanisms not originally supplied with the aforementioned safety feature.

A further object of the invention is to provide a safety lock, for incorporation in existing automobile door locks, which, in operative position, prevents either accidental or intentional opening of the door by locking both inner and outer door handles while the vehicle is in motion.

Still another object of the invention is to provide a novel device for bridging a current conductor across the gap between the movable door and the stationary body of a vehicle.

The invention possesses other objects and features of advantage, some of which, together with the foregoing, will be specifically set forth in the detailed description of the invention hereunto annexed. It is to be understood that the invention is not to be limited to the specific form thereof herein shown and described as various other embodiments thereof may be employed within the scope of the appended claim.

Referring to the drawing:

The figure is a view, diagrammatic in character, partly in perspective, partly in vertical section, and partly in side elevation, showing the component parts of the safety door lock of my invention, their relation to parts of an automobile, and the electric circuits connecting the said component parts.

In detail, I have shown a standard automobile door lock mechanism comprising the metal door member 2 to which is secured, by screws 3, a lock mounting plate 4 having, along its lower longitudinal edge, a horizontal flange 6. Slidably mounted in a suitable aperture provided in the vertical flange 7, which forms the outer vertical edge of the door member 2, is the retractible lock bolt 8 to which is secured, by rivets 9, one section 11 of the lock draw-bar, an end of which passes slidably through a loop guide 12 which is fastened to the plate 4 by means of screws or rivets 13. A spur 14 formed integrally with and rising from the upper edge of the draw-bar 11, adjacent its junction with the bolt 8, is positioned to impinge against a buffer block 16 of rubber or similar yieldable material secured to the flange 7 so as to absorb the rebound shock of the lock bolt, and a coiled leaf spring 17 secured at one end, by an anchor pin 18, to the mounting plate 4 and having its free end bearing against the end of the lock bolt, is provided for urging the lock bolt to its extended position. Also slidably mounted in the loop guide 12, and paralleling the draw-bar section 11, is a draw-bar section 19 connected at one end by a pivot pin or rivet 21 with a connector link 22 which is pivotally connected, by a pin or rivet 23 to the lever 24 mounted on and rotatable with the shaft 26 of the inner handle of the door of the vehicle. The other end of the draw-bar section 19 is provided, in its vertical edge with a lock notch 27 and on its upper edge with a spur 28 which engages one of a pair of lugs 29 extending from the upper and lower edges of the draw-bar section 11 and directed horizontally to positions overlying the upper and lower edges of the draw-bar section 19.

Immediately below the inner end of the lock bolt 8 is journaled a shaft 31, which is connected and rotatable with the outer handle of the vehicle door, on which is secured a hub 32 having an upwardly directed arm 33, entering a notch 34 formed in the lower edge of the latch bolt, and a horizontally directed lock arm 36 which is normally positioned in horizontal alinement with the lock notch 27 of the draw-bar section 19. When the handle shaft 31 is rotated, the movement of the arm 33 will withdraw the lock bolt 8 and will slide the draw-bar section 11 relative to the draw-bar section 19 in the loop guide 12 without imparting movement to the latter draw-bar section.

When the inner handle shaft 26 is rotated clockwise, as viewed in the figure, the draw-bar section 19 will be moved to the right and, since the spur 28 engages one of the lugs 29, the other draw-bar section 11 will be similarly moved thereby retracting the lock bolt 8. Counter-clockwise rotation of the shaft 26 will move the draw-bar section 19 to the left, while the draw-bar section 11 remains stationary, thereby causing the notch 27 to pass over the end of the lock arm 36. In this position, the outer handle shaft 31 is securely locked against rotation and consequently the vehicle door can not be opened by movement of the exterior handle.

In the ordinary automobile there is no provision, other than that just described, for locking the doors against being accidently opened. Numerous serious accidents have occurred, particularly to children who have been allowed to ride in the rear passenger space of sedans, due to the fact that the children, standing on the floor of the car, frequently lean against the doors, grasping the inner door handle, and accidently open the door which results in their being pitched from the car to the roadway and incurring dangerous if not fatal injuries. There have been numerous safety locks proposed which will preclude the possibility of such accidents happening but all of these are complicated and require extensive alteration or additions to the car doors for their installation which, obviously, renders them quite costly.

I have provided a safety lock structure which is extremely simple and requires no great skill in its installation. In applying the device to an existing automobile door lock, I cut, in the flange 6 directly below and a little toward the side of the door from which the lock bolt 8 protrudes, a notch in which is placed an electro-magnetic latch comprising a metal frame 37 having apertured lugs 38 which receive the mounting screws 39, the upper or horizontal member 41 of the frame being centrally apertured to slidably receive an armature 42 having an enlarged rectangular head 43 topped by a pad 44 of rubber or similar resilient material. An energizing coil 46 is mounted in the frame 37, encloses the armature 42 and is provided with current conductors 47 and 48, the former of which connects with one of the mounting screws 39, which is at ground potential, and the latter of which connects with an insulated terminal 49 which is carried by a lug 51 extending downwardly from the frame 37. The arrangement is such that when the coil 46 is energized the armature 42 will be projected upwardly causing the armature head 43 to move into the space between the lower lug 29 and the side of the loop guide 12 thereby preventing movement of the draw-bar section 11 by either the inner or outer door handle and consequently securely locking the lock bolt against movement.

The terminal 49 is connected, by a conductor 52 with a terminal positioned in the hinged edge of the door comprising a stud 53 which passes through a suitable aperture 54 formed in the door edge, is fitted with an insulating sleeve 56 and washers 57 and has an enlarged exposed head 58. A pair of nuts 59 threadedly engaging the stud 53 are provided for securing the conductor 52 to the stud. The adjacent vertical edge of the door frame 61 is provided with an aperture 62, horizontally alined with the door aperture 54, through which is passed a tubular metallic guide 63 and an insulating sleeve 64 and washers 66 are provided for insulating the guide from the frame 61.

A collar 67 which is fitted with a setscrew 68, also serving as a terminal for a conductor 69, is provided for securely holding the guide in place. Slidably mounted in the bore of the guide is a plunger 71 having a head 72 and a coil spring 73 within the guide urges the head 72 into intimate contact with the head 58 of the insulated door terminal. A collar 74, held in place on the end of the plunger 71 by a setscrew 76, serves to retain the plunger in the guide. The above described structure provides for the conduction of current to the electro-magnetic latch and will provide longer trouble-free service than a jumper wire which, after repeated opening and closing of the door is liable to become crystallized and break.

The conductor 69 is connected to one terminal of a battery 77 and a conductor 78 connects the other battery terminal with one terminal 79 of a centrifugal switch 81 which is connected in and driven by the drive cable 82 of the speedometer 83. The other terminal 84 of the switch 81 is grounded. The switch 81, containing a rotor which, when rotated by the speedometer cable as the vehicle is moving in a forward direction, causes globules of mercury to bridge the contacts 79—84, is described in my prior application Serial No. 319,865, filed February 20, 1940. I prefer to use this particular switch in the safety lock described herein as its action is superior in many respects to that of spring-resisted centrifugal switches.

Having thus described my invention, what I claim as new and desire to secure by Letters Patent is:

In an auto door lock having a frame provided with a slidably reciprocable lock bolt, a fixed guide on said frame, and a draw bar slidable in said fixed guide and connected with and to move said lock bolt, said draw bar comprising a pair of contiguously disposed draw bar sections, the first of said draw bar sections having a spur rising therefrom and the second of said draw bar sections being provided with a lug overlying said first draw bar section and engageable by the spur thereof when the first draw bar section is moved so as to connect the draw bar sections for movement together in one direction and allow free movement of said first draw bar section in an opposite direction relative to the second draw bar section, an additional lug on said second draw bar section being positioned in spaced relation with the adjacent end of said fixed guide, the combination of a metal frame forming a magnetic circuit mounted on said lock frame adjacent said end of the guide and provided with an energizing coil and a movable armature, and said armature having an enlarged head portion substantially equal in width to the space between said additional lug and the end of said guide and entering said space when the coil is energized so as to dog said draw bar sections against movement toward said guide.

JOHN F. CHING.